United States Patent [19]
Bishop et al.

[11] Patent Number: 5,119,434
[45] Date of Patent: Jun. 2, 1992

[54] METHOD OF AND APPARATUS FOR GEOMETRIC PATTERN INSPECTION EMPLOYING INTELLIGENT IMAGED-PATTERN SHRINKING, EXPANDING AND PROCESSING TO IDENTIFY PREDETERMINED FEATURES AND TOLERANCES

[75] Inventors: Robert Bishop, Newton Centre; Richard Damon, Brighton, both of Mass.

[73] Assignee: Beltronics, Inc., Newton, Mass.

[21] Appl. No.: 636,413

[22] Filed: Dec. 31, 1990

[51] Int. Cl.⁵ .............................. G06K 9/52
[52] U.S. Cl. .............................. 382/8; 382/55; 358/106; 356/237
[58] Field of Search ............... 382/8, 55; 358/106, 358/107; 356/237

[56] References Cited

U.S. PATENT DOCUMENTS

| | | | |
|---|---|---|---|
| 4,443,855 | 4/1984 | Bishop et al. | 364/513 |
| 4,500,202 | 2/1985 | Smyth | 356/237 |
| 4,589,140 | 5/1986 | Bishop et al. | 382/8 |
| 4,692,943 | 9/1987 | Pietzsch et al. | 382/8 |
| 4,776,022 | 10/1988 | Fox et al. | 382/8 |
| 4,794,647 | 12/1988 | Forgues et al. | 358/106 |
| 4,893,346 | 1/1990 | Bishop | 382/8 |

*Primary Examiner*—Leo H. Boudreau
*Assistant Examiner*—David Fox
*Attorney, Agent, or Firm*—Rines and Rines

[57] ABSTRACT

A pattern inspection technique and apparatus, suitable for wafer and printed circuit board and related applications, employing novel intelligent imaged-pattern shrinking and expanding architecture to identify permissible line widths, spacing and in surrounding material context, and to identify defects or errors.

38 Claims, 11 Drawing Sheets

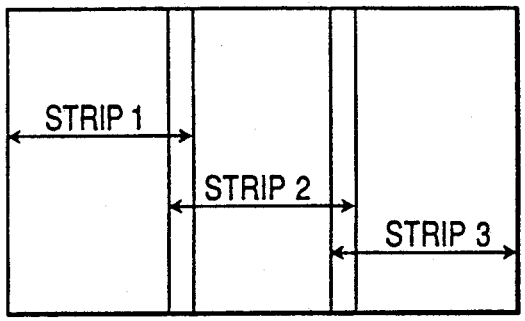
FIG. 1
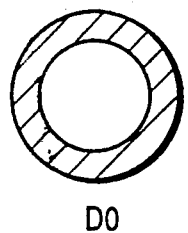
FIG. 1A
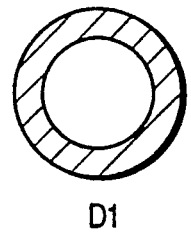
FIG. 1B
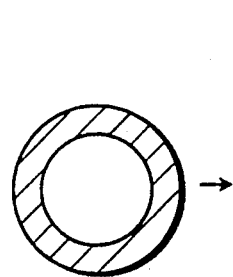
IMAGE BIT D0
INITIALLY
FIG. 2A
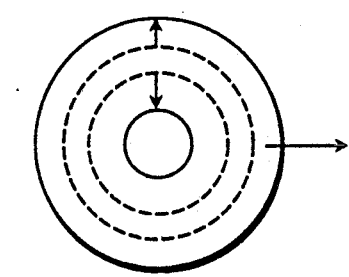
IMAGE BIT D0 AFTER
A NUMBER OF SHRINKS
FIG. 2B
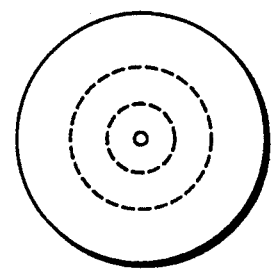
FINAL IMAGE BIT D0
SHRINK STOPS WHEN
CENTER EQUALS
ISOLATED PIXEL
FIG. 2C
IMAGE BIT D0
AFTER POINTS
ARE MARKED
AS HOLES
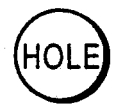
INITIALLY
FIG. 3A
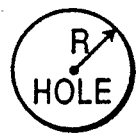
AFTER SEVERAL
EXPANDS
FIG. 3B
FINAL
RESULT
FIG. 3C
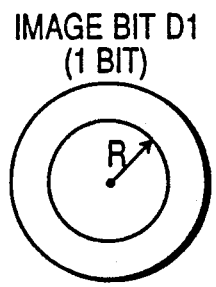
ORIGINAL
IMAGE
FIG. 3D

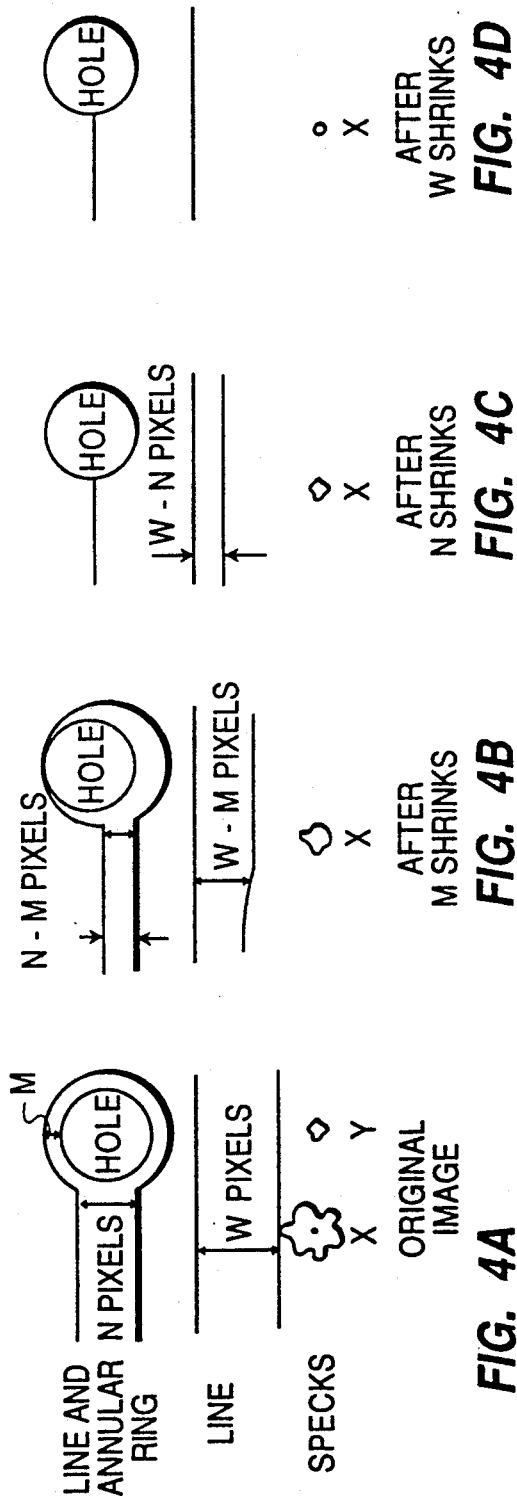
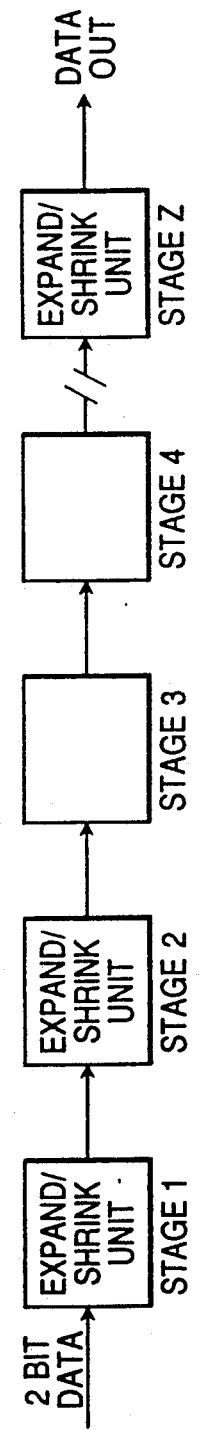

ORIGINAL IMAGE

FINAL IMAGE

METHOD OF AND APPARATUS FOR
GEOMETRIC PATTERN INSPECTION
EMPLOYING INTELLIGENT IMAGED-PATTERN
SHRINKING, EXPANDING AND PROCESSING TO
IDENTIFY PREDETERMINED FEATURES AND
TOLERANCES

The present invention relates to the scanned inspection of geometric patterns for identifying predetermined features, being more particularly directed, for example, to the inspection of manufacturing errors or defects in conductor and other patterns and the like imposed on silicon or other substrates in solid state wafers and on printed circuit boards and reticles and related devices, though applicable also to general two-dimensional scanned images of geometric patterns broadly.

BACKGROUND

Numerous approaches have been used for the scanned inspection and detection of errors or defects in printed circuit boards and other systems, including matching scanned images with "template" standard patterns, and, more recently, image shape learning and comparison, as in U.S. Pat. Nos. 4,589,140 and 4,893,346, all originally issued to the common assignee of the present invention. While most useful for such purposes, there are applications, as in the before-mentioned wafer. reticle and similar devices, where somewhat less complicated and less costly techniques are desirable, including with advantages of total independence of feature orientation and, if desired, the checking for missing features, as well.

While the art has been well familiar with in-line inspection technologies including the use of image expansion and contraction techniques as taught, for example, in U.S. Pat. No. 4,443,855 of said common assignee, it has, however. not apparently earlier been discovered that imparting a novel type of sequence of intelligence to the image shrinking and expansion process can produce the discovery underlying the present invention of solving the above-mentioned and related problems.

OBJECTS OF INVENTION

An object of the invention, accordingly, is to provide a new and improved method of and apparatus for geometric pattern inspection employing novel intelligent scanned-image-pattern shrinking and expanding process to identify predetermined features, including specifically manufacturing errors and defects in such devices as solid state wafers and reticles and, more generally, two-dimensional scanned images of geometric patterns broadly, including, but not limited to, defect inspection in printed circuit layouts, designs, boards and the like.

A further object is to provide in such apparatus improved features of a new degree of independence of feature orientation and, if desired, to provide for the checking of missing features, as well.

Still another object is to provide such inspection improvement at relatively low cost ás compared with present-day techniques.

Another object is to provide a novel shrink or expand stage particularly adapted for the above purposes and more generally useful, also.

An additional object is to effect such shrinking and expanding to determine permissible ranges of line widths and line spacings, and also, where needed, in the context of the imaged materials surrounding the conductor lines on the substrate.

Other and further objects will be explained hereinafter and are more particularly delineated in the appended claims.

SUMMARY

In summary, however, the invention, from one of its broader viewpoints, embraces a method of detecting deviation of a scan-imaged conductor line width from a predetermined range(s) of allowable numbers of pixels, wherein the conductor line is of a particular metal material carried on a substrate of other material surrounding the line, as on a wafer or printed circuit board, the method comprising scan-imaging the conductor line and the surrounding substrate regions; establishing and programming each of a predetermined permissible range(s) of allowable number of pixels of line width and a permissible line-surrounding region combination; successively electronically shrinking the imaged conductor line, one pixel at a time, in a number of successive sequential shrinking stage operations until the imaged line in one such stage is only one pixel; examining in accordance with said programming the thusly shrunk image in the context of its said surrounding substrate regions to verify the said permissible line-surrounding region combination; and indicating an error in the event that either the line-surrounding region is not verified as said permissible combination, or the sequential number of the said one stage is less or greater than the stage number(s) corresponding to said permissible range(s) of pixels. Preferred apparatus design features and best mode implementation are later detailed for each of illustrative wafer and printed circuit board applications.

DRAWINGS

The invention will now be described with reference to the accompanying drawings, FIG. 1 of which is a pattern of overlapped object scans that enables the marking of "don't care" regions of inspection in accordance with the invention;

FIGS. 1, 1A and 1B are hole processing images;

FIGS. 2A, B and C are similar diagrams of the image shrinking steps for the image of FIG. 1A for processing holes in the pattern;

FIGS. 3A, B, C and D show successive expansion steps;

FIGS. 4A, B, C and D illustrate successive image-shrinking steps for checking conductor line-width errors, including annular ring widths;

FIG. 5 is a block diagram of Z-stage cascade processing effecting the shrinking of FIGS. 4A-C.

Figure 12:
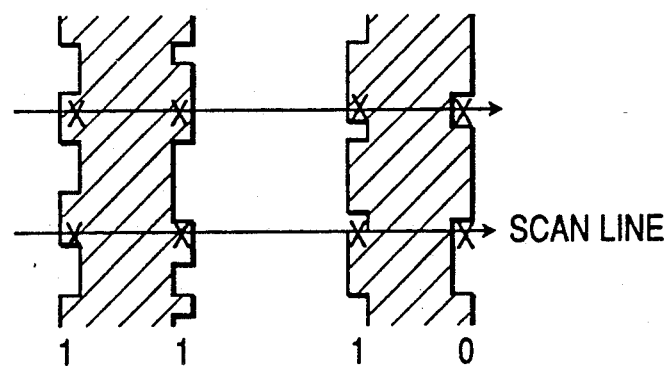
Figure 11A:
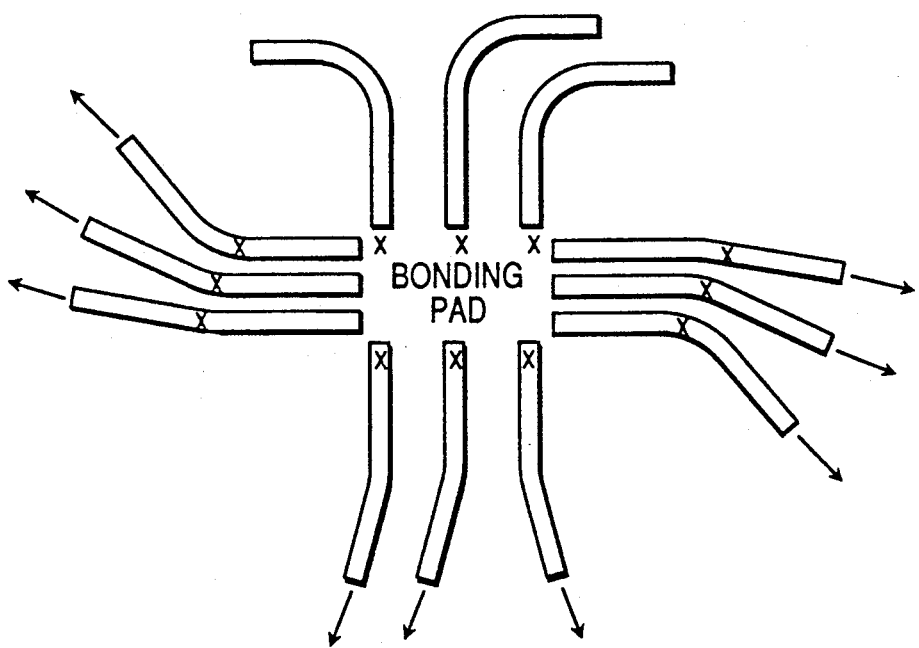
Figure 13:
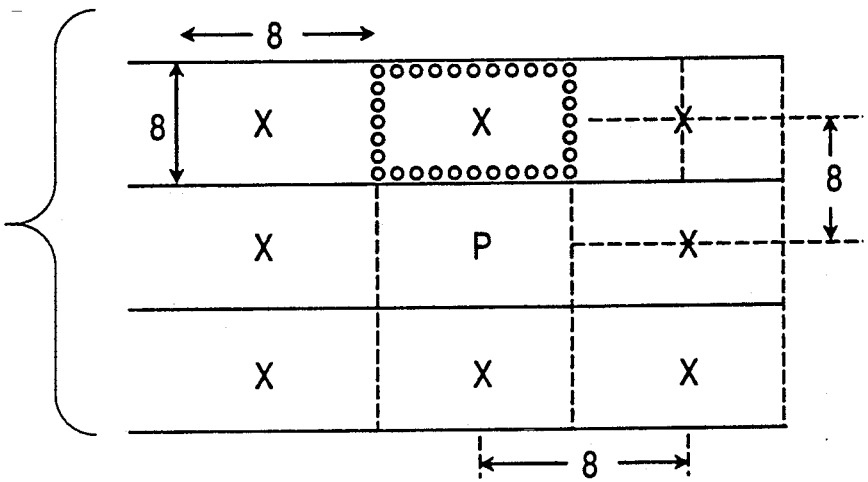
Figure 14:
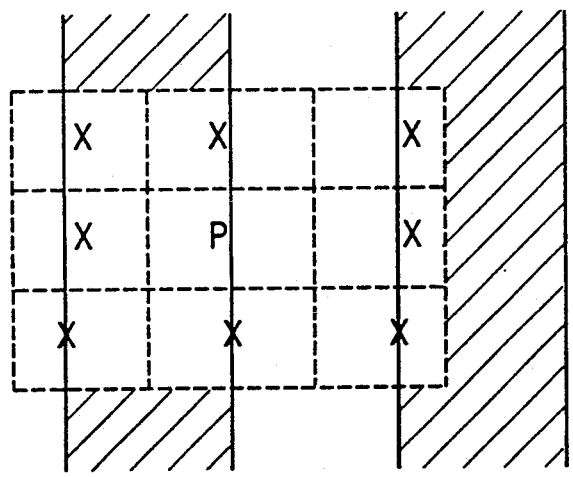

FIGS. 11A and B are respectively diagrams of illustrative bonding pad conductive finger "dead ends" and a break, respectively;

FIG. 12 is a further illustrative line pattern with scan line paths for seeking missing features;

FIGS. 13 and 14 are pixel sub-sampling matrices for use with the missing feature examination of FIG. 12.

Figure 10:
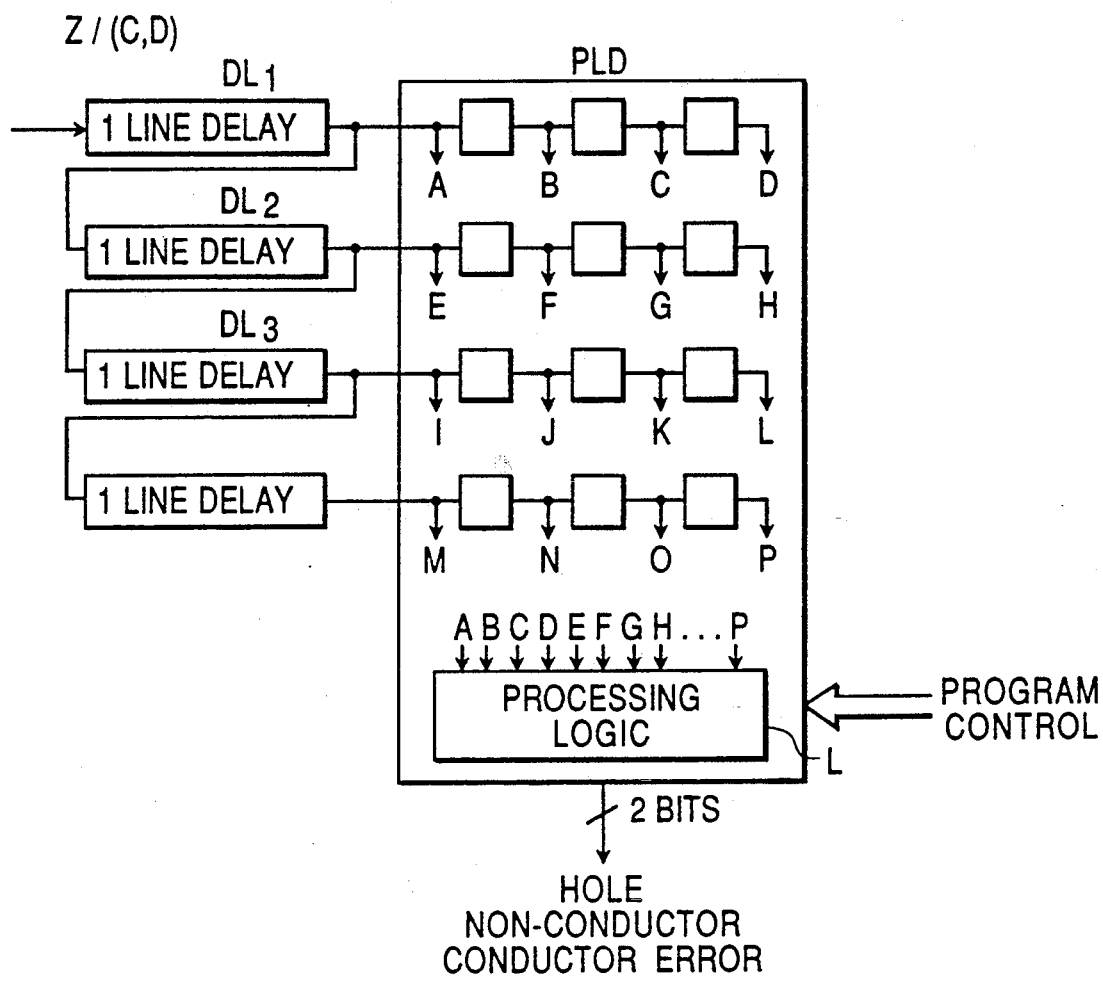
Figure 15:
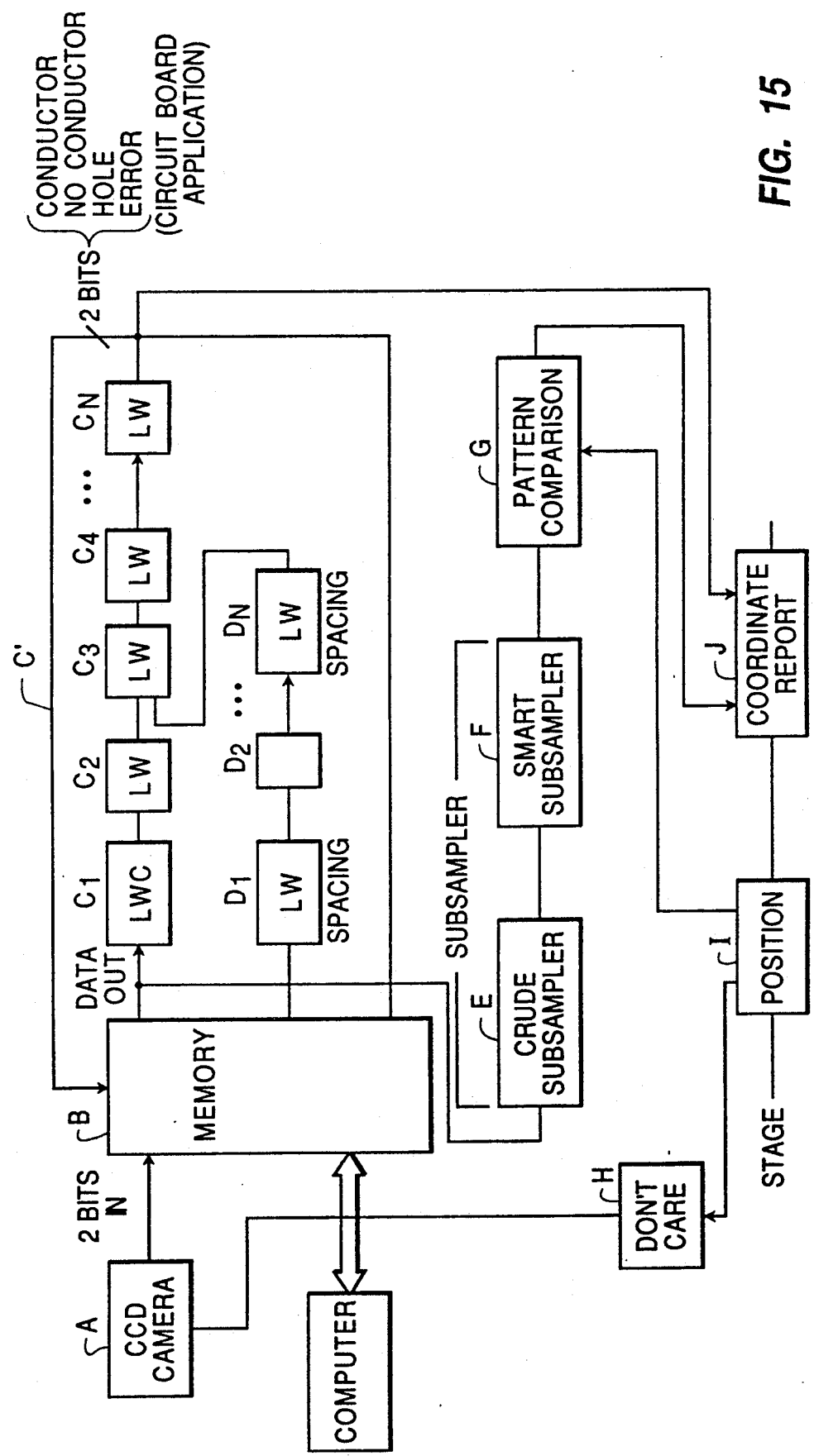
Figure 16:
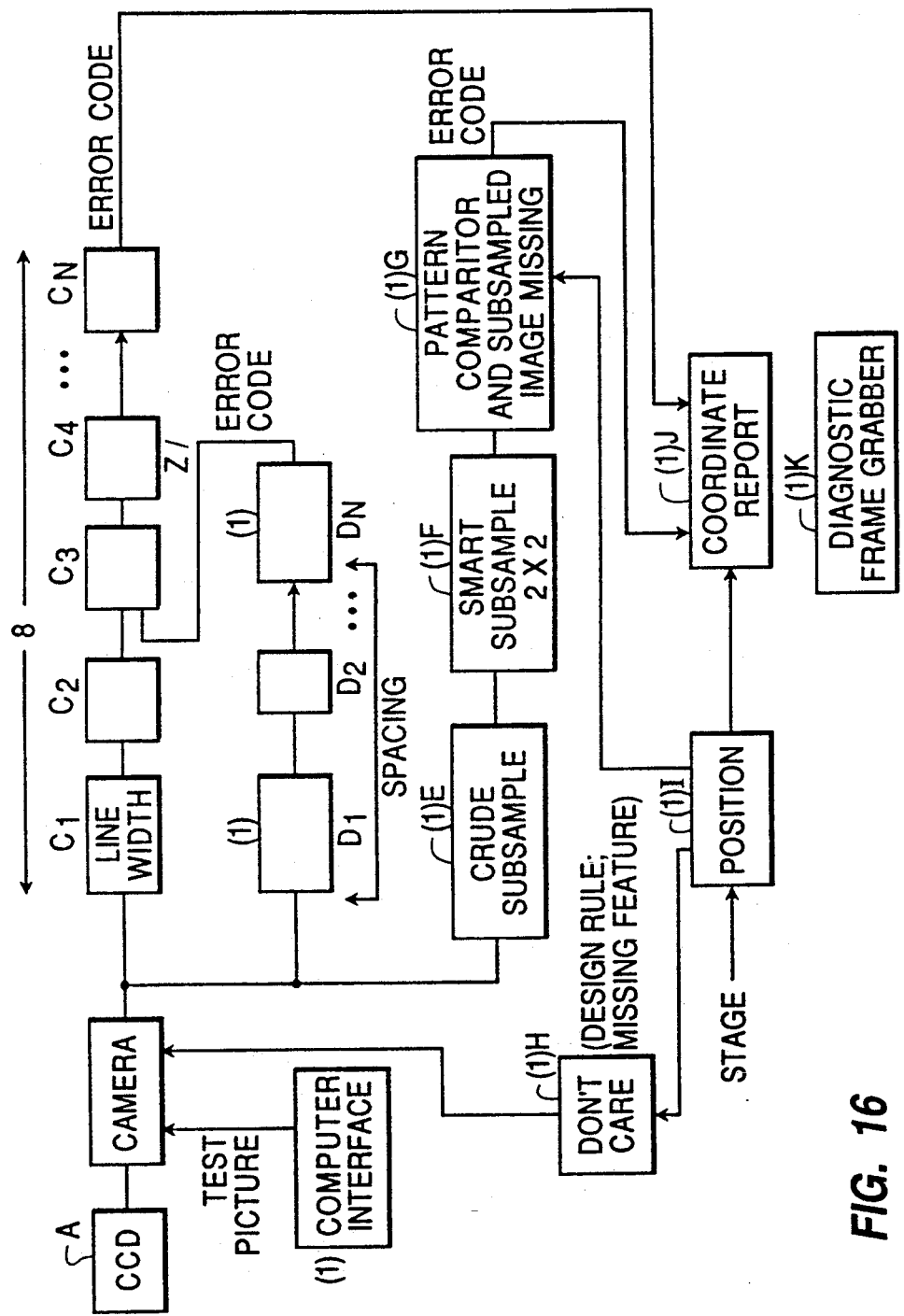
Figure 17:
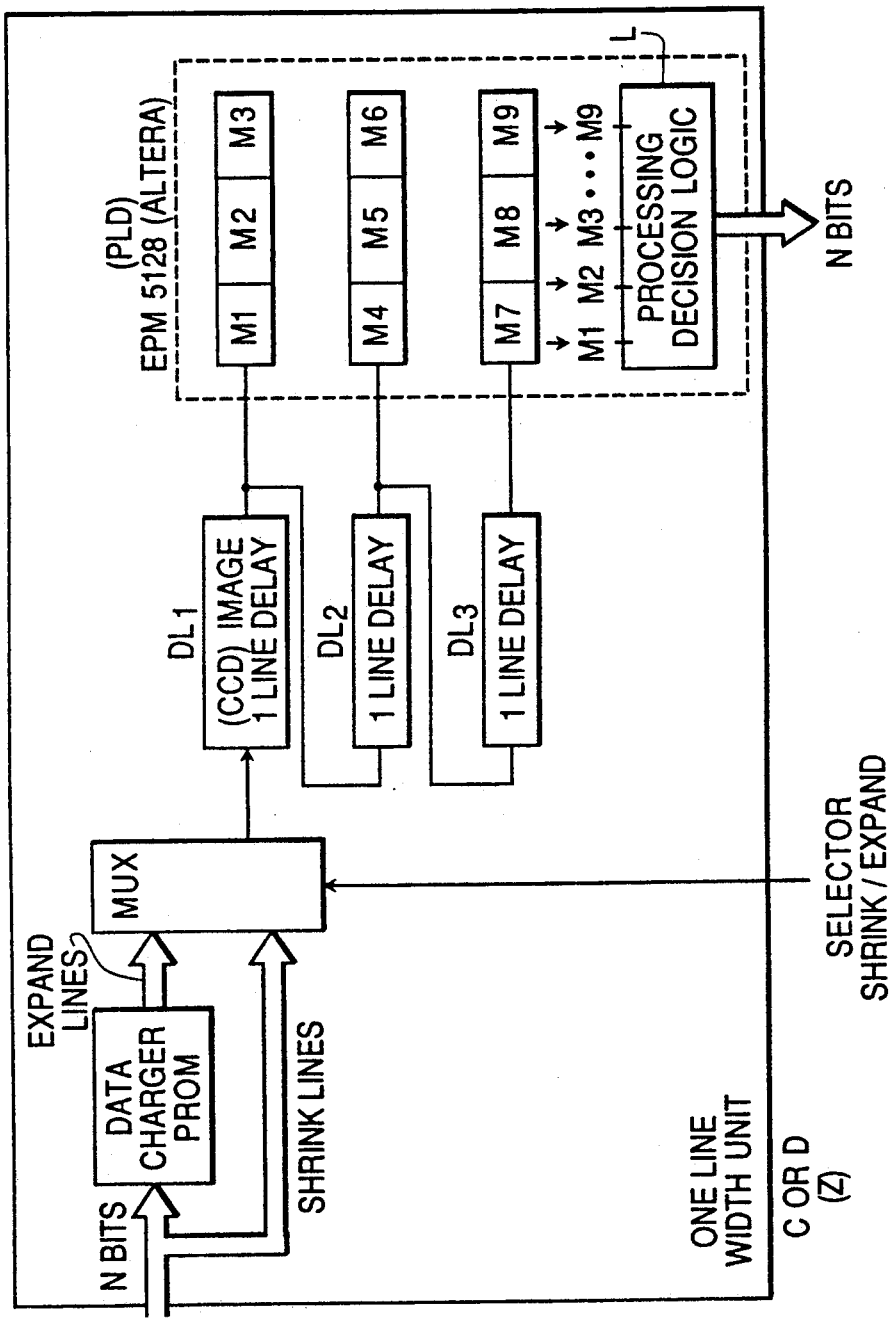
Figure 18:
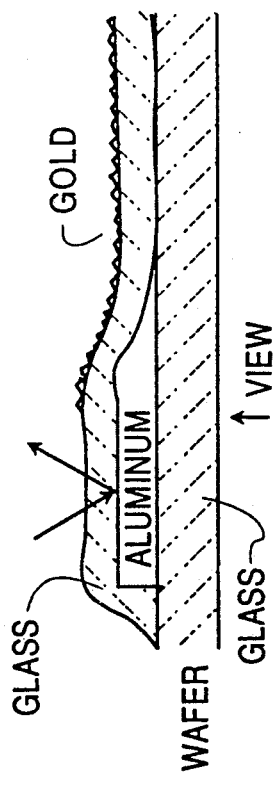
Figure 19:
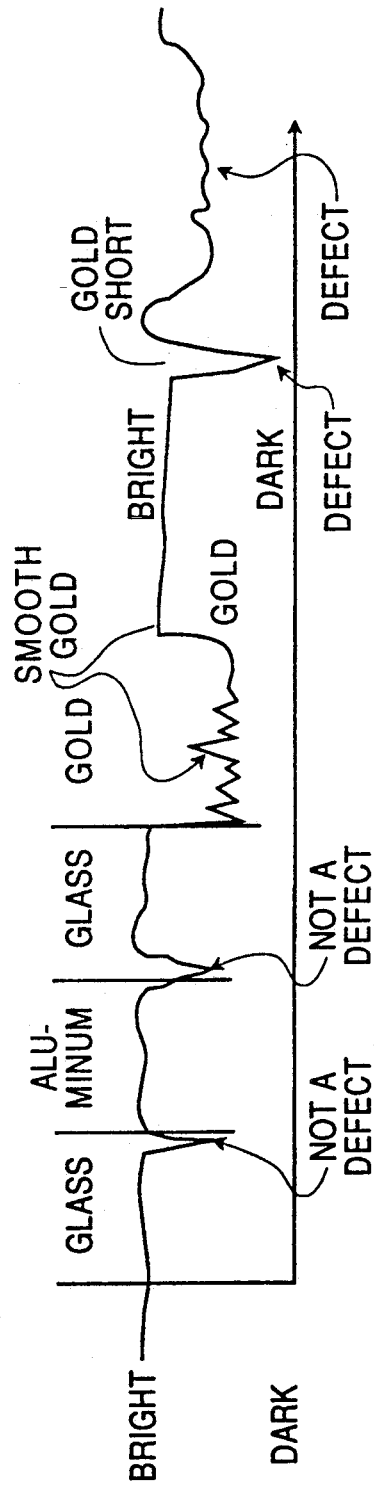

FIG. 15 is a block circuit diagram of a preferred wafer and/or printed circuit board inspection system using the technique and algorithmic approach of the invention;

FIG. 16 is a view similar to FIG. 15 of a modified wafer inspection system;

FIG. 17 is a circuit detail, redrafted from FIG. 10, of the novel programmed intelligent shrink and expand stage limits of the invention employed in the embodiments of FIGS. 15 and 16; and FIGS. 18 and 19 are respectively a cross-section view of a fragment of a wafer and of the brightness signal scan distribution thereof.

DESCRIPTION

As before stated, in accordance with the novel method and apparatus of the invention, a novel sequence of intelligent shrinking and expanding operations is provided which has been structured to identify certain features such as permissible conductor line widths and spacings and location on substrate materials and the like. In the exemplary case of wafer patterns, such features are thick conductor lines, thin or thick spaces, nicks, breaks, protrusions, etc. In printed circuit board and similar applications, thin and thick lines, spaces, nicks, breaks, shorts, protrusions, and via holes are features to be inspected. As also earlier stated, one of the major advantages of this technique is that analysis is totally independent of feature orientation. In addition, the invention analyzes the combination of the conductor-surrounding substrate region material context further to verify the inspection process.

The invention will be described proceeding first to a generalized discussion of the underlying philosophy of various algorithms or operation steps useful under the marking of "don't care" regions of the pattern and then to the checking for conductive line width errors in the wafer, circuit board or other pattern, and then to the processing of holes as in annular rings, annular ring width and breaks and line protrusions, etc. specific to circuit board applications.

Underlying Algorithmic or Operational Steps

(Decision Rules)

Step 1. Marking "Don't Care" Regions

As in prior image inspection systems, the technique begins by scanning the pattern as with CCD or other image scanning sensors, including those described in the previously referenced patents. It is convenient for the purposes of the present invention, however, to scan the pattern in consecutive or successive overlapping strips as shown in FIG. 1 at "Strip 1", "Strip 2", etc., but with each strip equalling the width of the scanning sensor. While scanning the pattern, the instantaneous x-y spatial coordinate is compared to a predetermined stored list of "Don't Care" coordinates. If a "Don't Care" coordinate is intercepted, it is marked as an invalid region and no defects will be flagged in these regions. Depending upon the mode of implementation, the image is either placed in a memory in which "Don't Care" regions are marked as such, as later described in connection with the embodiments of FIGS. 15 and 16, or the data is processed in a sequential manner, in which case, a valid bit accompanies the data and is used to mark the "Don't Care" regions. If the object contains holes, as in the case of printed circuit boards, for example, the image of at least one strip must be placed in a memory to permit the holes to be analyzed in each sequential strip.

Step 2. Processing Holes

To process a circuit board or other two-dimensional pattern containing holes, the technique underlying the invention employs two image data paths, shown as typical annular conductor ring circuit traces DO and DI in FIGS. 1A and B, which are initially identical and represent the scanned image of the via hole defined within the conductor ring line. Data bit DO will be processed to identify and fill via holes, while bit D1 remains unaltered and is processed later, as more fully hereinafter described.

The blank areas in the image DO of FIG. 1A are shrunk, as by the techniques of earlier said U.S. Pat. No. 4,443,855, looking for single pixel points of blank, surrounded by conductor material. FIGS. 2A through C show an appropriate sequence of the later-described shrinking (FIGS. 15, 16 and 17) leading to this image, with FIG. 2A illustrating the initial DO bit image; FIG. 2B, the reduced image after a few shrinks; and FIG. 3B, the final shrink and stoppage as the DO center becomes an isolated single pixel.

It will be observed that, in accordance with the methodology of the invention, the shrinking is such that continuity is never changed. Thus, single pixel blank points are never filled in, and lines are never merged, even though the shrinking of other larger holes may still be in process. Once a predetermined number of shrinks has been effected, in order to guarantee that all good holes have been reduced to a single blank pixel, the shrinking is stopped. To insure, however, that pinholes are not mistaken for deliberately formed via holes, a minimum number of shrinks is required.

All single isolated blank points are then marked as "holes". All other points are marked as "not holes" in the image DO. Thus, the image DO only contains points marking the center location of all holes, and all other information is erased.

Points marked "holes" are now expanded in image DO for any location marked as not a conductor in image D1, FIG. 1B, as shown in FIGS. 3A–D. FIG. 3A shows the image bit DO after the points have been marked as "holes"; FIG. 3B, the same after several expands; and FIG. 3C, the final expansion or radius R. This final expansion of FIG. 3C, resulting from the before-described intelligent sequencing of shrinking and expanding of image DO, FIG. 1A, is therefore combined with image bit D1, FIG. 1B, and both image bits are now processed together, with bit DO marking the location of holes and bit D1 marking the location of conductor, later described in connection with FIGS. 15 and 17. (In images not containing holes, this last-described step can be eliminated.)

Step 3. Line and Annular Ring Width Error Checking

It is now in order to check for line width errors, including annular ring width.

The image in memory is now passed through a sequence of intelligent programmable expand-or-shrink modules, FIGS. 15 and 16, and patterns are first shrunk until lines, in the case of wafers, printed circuit boards and similar items and annular rings, in the case of printed circuit boards and the like, have been reduced to single pixel-wide feature as shown in FIGS. 4A through D. In the original image of FIG. 4A, the illustrative upper conductor line is shown N pixels wide, the upper annular ring M pixels wide, and the lower line W pixels wide. After M shrinks, the upper boundary of the annular hole becomes that of the annular ring conductor, with the line shrunk to N-M pixels, FIG. 4B. FIGS. 4C and D respectively show the results of N further shrinks and W further shrinks, the upper line and annular ring becoming reduced to a pixel line and hole, and the lower conductor line reducing to a one pixel line.

The programmable expand-or-shrink units are preferably cascaded by successive stage units, I through Z, FIG. 5, labeled $C_1$–$C_N$ and $D_1$–$D_N$ in FIGS. 15-17, and each unit is individually programmed as to how to analyze the data passing through it, with predetermined intelligence. In accordance with the invention, the preferred and exemplary intelligence sequence incorporated into each unit reflects knowledge of whether a single pixel-wide line is an allowable or not permissible pattern and depending upon whether it is between a region of hole and non-conductor or between two regions of non-conductors. For example, annular rings may only be M pixels wide, while lines may be N or W pixels wide, where $M<N<W<Z$, as before described in connection with FIGS. 4A-D. After M shrinks, accordingly, a single pixel wide line segment will be allowable if it is surrounded by a hole region on one side and a non-conductor on the other, which identifies the line segment as part of an annular ring. However, if the line segment is surrounded by non-conductor material on both sides, it is a non-allowable line width error pattern.

The group of Z expand-or-shrink (EXPAND/SHRINK) units, ($C_1$–$C_N$ and $D_1$–$D_N$ in FIGS. 15-7, as before stated), may be programmed to allow various line widths within a given tolerance range. The following Table lists how the Z (or C and D) units would be programmed to allow:
1. annular rings M pixels±1 pixel
2. lines N pixels±2 pixels
3. lines W pixels+1 pixels
4. removal of specks ≦3 pixels
5. removal of protrusions ≦2 pixels Specks of certain sizes are removed, shown initially at "X" and "Y" in FIG. 4A, as the region of conductor is ultimately reduced to a single pixel of conductor. A small speck such as "Y" is removed by the shrinkage in FIG. 4B, the unit being programmed to replace it by non-conductor. Thus specks can be removed while continuity of conductor traces are maintained; i.e., single pixel wide lines are never removed.

If a unit detects a single pixel line segment in a stage not programmed to allow such, the data is marked as defective. In the above example, therefore, the following line widths "1" would be considered defects:
$1 \leq N-3$
$N+3 \leq 1 \leq W-3$
$W+2 \leq 1$.

The intelligent expand/shrink units also detect breaks (line 3 in FIG. 6A) and minor and acceptable, and large and unacceptable protrusions (lines 1 and 2 in FIG. 6A, respectively) by detecting single pixel-wide dead end lines that are at least X pixels long from the dead end side, where X is programmable. The protuberances in lines 1 and 2 of FIG. 6A reduce to single pixel stick-figure short lines $l_1$ and $l_2$ in the final image of FIG. 6B, and the line break of line 3 becomes pixel line segments $l_3$ and $l_4$, where, accordingly, the protrusion in line 1 would not be marked as an error, while the protrusion in line 2 and break in line 3 would be marked as errors.

Figure 6:
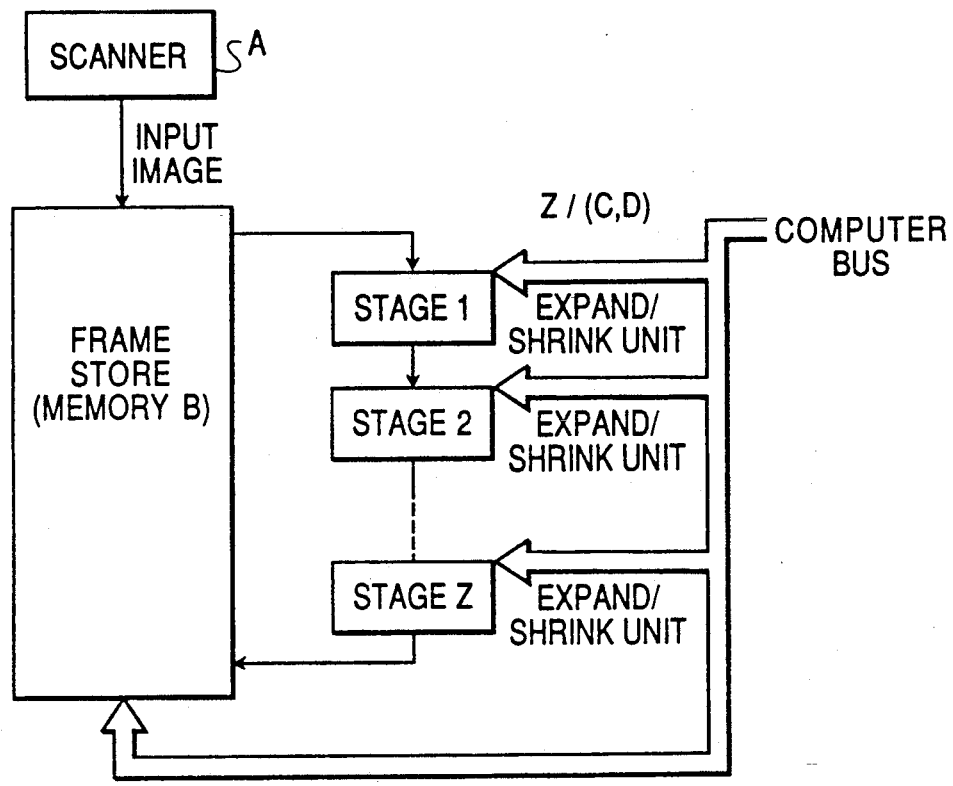
FIG. 6 is a block circuit diagram of the Z-stage (also referred to as C and D stages) expand/shrink units and frame storage.
Figure 6A:
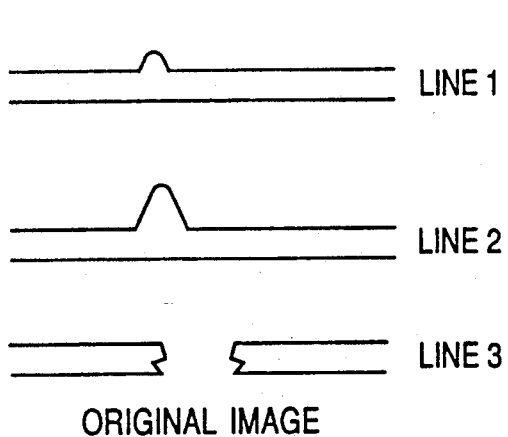
FIGS. 6A and 6B are, respectively, diagrams of conductor line break detection.
Figure 6B:
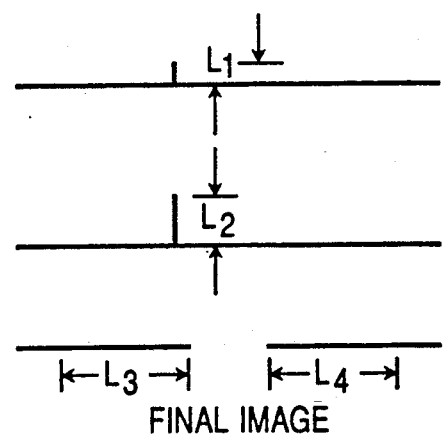

One of the major differences of the approach of the present invention from other prior skeleton pattern techniques is that intelligence is used in the generating of the single pixel stick figure patterns of FIG. 6B, for example, and in the making of the final decisions from analyzing the image, rather than using a template pattern match.

Once all the line width type defects (which are defects in conductors) have been located and marked as such, spacing violations and defects in non-conductor regions must be detected. This is done by shrinking the non-conductor regions (or expanding the conductor regions) in the original image and performing the same type of analysis on non-conductor regions as performed on conductor regions, as above described. To perform this analysis, the original image cannot be destroyed. This is achieved by constructing the expand/shrink units with a sufficient number of stages so that all the processing is done within the Z stages, FIGS. 5 and 6 (C and D in FIGS. 15-17); such that the defects are detected within the Z (or C,D) stages. The defect loca-

TABLE I

| STAGE | SHRINK | EXPAND | ALLOWABLE ANNULAR RING | ALLOWABLE SINGLE PIXEL LINES | REMOVE SPECKS ≦3 PIXELS | REMOVE PROTRUSIONS ≦3 PIXELS |
|---|---|---|---|---|---|---|
| 1 | yes | no | no | no | yes | yes |
| 2 | yes | no | no | no | yes | yes |
| 3 | | | no | no | yes | no |
| 4 | | | no | no | no | no |
| | | | no | no | | |
| M−1 | yes | no | yes | no | no | no |
| M | yes | no | yes | no | no | no |
| M+1 | yes | no | yes | no | no | no |
| | | | no | | no | no |
| N−2 | yes | no | no | yes | no | no |
| N−1 | yes | no | no | yes | no | no |
| N | yes | no | no | yes | no | no |
| N+1 | yes | no | no | yes | no | no |
| N+2 | yes | no | no | yes | no | no |
| | | | | | | |
| W−2 | yes | no | no | yes | no | no |
| W−1 | yes | no | no | yes | no | no |
| W | yes | no | no | yes | no | no |
| W+1 | yes | no | no | yes | no | no | tions are recorded either in the image memory or in a separate memory, without altering non-defect image memory location. The output of stage Z in FIG. 6 indicates which coordinates are to be marked defective, later described also in connection with Coordinate Report J of FIGS. 15 and 16. After checking all conductors by performing a shrink operation and marking the defect location, the Z (or C,D) stages are programmed to expand the conductors—this, as above pointed out, being the same as shrinking the non-conductor regions—and all defects are marked as such. Any location previously marked in a stage of analysis as a defect remains a defect.

Figure 7:
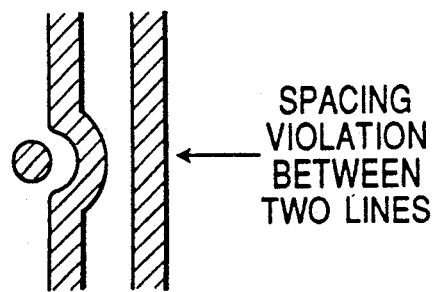
FIG. 7 is a diagram of a typical, illustrative line spacing violation or error.

FIG. 7 illustrates a typical spacing violation between the lines.

Figure 8:
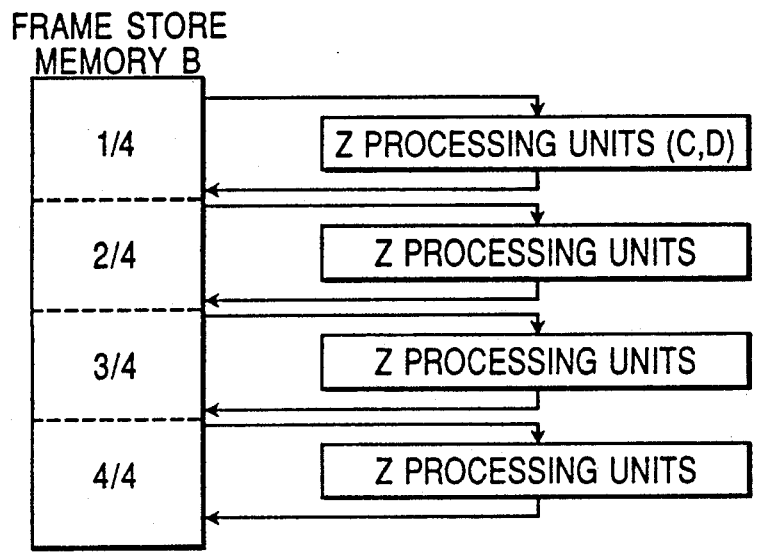
FIG. 8 is a block diagram of processing speed increasing by parallel processing.

Processing speed can be increased by paralleling processing units in such a way that the first stage unit processes data in the first half of memory while the second unit processes data in the second half of memory. As many processing units as desired can be placed in parallel and the image memory B divided into the corresponding number of sections "S" to increase processing by a factor of S, as shown in FIG. 8 for the example of S=4.

Figure 9:
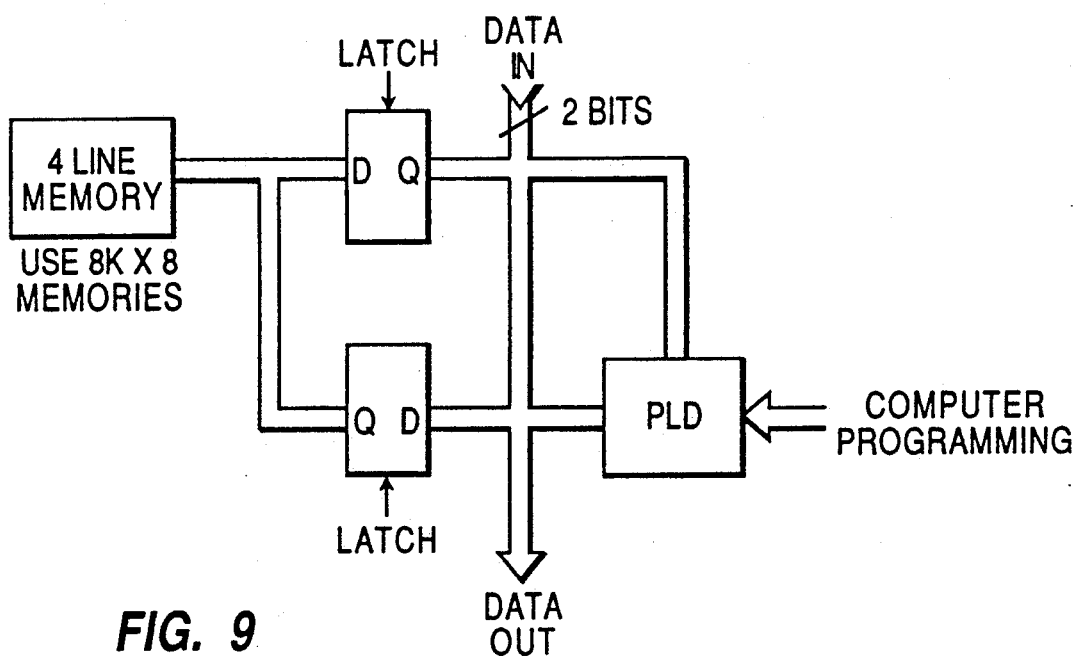
FIGS. 9 and 10 are block and flow diagrams of expand/shrink and shrinking and expanding processing units, respectively.

Flow and block diagrams are shown respectively in FIGS. 9 and 10 for a single stage Z (C or D in FIG. 17). Each stage is implemented using programmable logic devices (PLD's) L to achieve greater packing density of electronics.

Referring again to FIG. 10 and later-described FIG. 17, suitable components for implementing the same may be as follows:

Altera Corporation PLD's EP-600, EP-900 and EP-1800 for performing the expand/shrink logic, FIG. 10 and later-described FIG. 17.

8k×8 static memories, P4C164-25PC, 25 nanosecond access time of Performance Company and 74F163 counters by Fairchild to perform the one line delays $DL_1$, $DL_2$, etc. shown in FIGS. 10 and 17.

1Meg×8 Dynamic RAM memories, THM81020 AS-/AL-70, 70 nanosecond access time of Toshiba, to implement the Frame Store image or memory B shown in FIGS. 6, 8 and later-described FIGS. 15 and 16.

Octal Latches 74F374 of Fairchild to implement the latches shown in FIG. 9.

Step 4. Missing Features

Figure 11B:
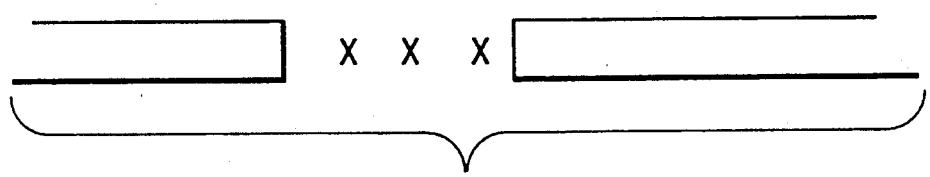

As before stated, it may also be desirable to check for missing features in the pattern. This can be achieved by incorporating a memory for intelligently analyzing data points and checking for the presence or absence of a feature. This is especially useful for patterns which incorporate dead end lines as correct features, such as fingers for bonding, as shown in FIG. 11A. The bonding pad, so-labelled, correctly ends in a dead end line which is not an error. This is as contrasted with an actual line break, FIG. 11B, which is an error. By comparing an intelligent sampling of a good stored image to the actual image, however, one can easily detect a large break; and small breaks are detected as minimum spacing violations, before described. To compute a reference image that can be stored in as little memory as possible, it is desirable to obtain the intelligent sampling of the good image, using a local region compression analysis which operates as follows.

Consider a pattern that has minimum line widths and spacings equal to P pixels. Due to quantization, the digital image of the lines and spacings will have a variation of ±1 pixel. If the image be sampled at every $P^{th}$ pixel, a feature could be missed as shown by the sampled scan line in FIG. 12 which does not detect the space between the two lines. If the sampling is effected at the Nyquist rate (P/2 pixel spacing), in both X and Y directions, one would require 4 times as much memory storage. For intelligently sampling the picture, therefore, the value of each $P^{th}$ sample point is computed on the neighborhood of pixel values around the sample point, and previously determined neighboring samples. For P=8, the original image would be subsampled by a factor of eight. To determine the value of each $8^{th}$ sample point, a region of 24×24 pixels divided into nine groups is examined, as shown in FIG. 13. Estimated values for each of the 8 groups surrounding the center group are first obtained by dividing each group into 4 sections, computing the average value for each section and then computing a majority "vote" of the section value to yield the estimated value for the specific group. These eight estimated group values plus the values of the pixels within the center group are used to determine the value of the $P^{th}$ center sample point.

Using this approach eliminates the problem of missing features, such as the space missed by sampling. For example, consider the two parallel lines originally drawn in FIG. 12, redrawn in FIG. 14 as superimposed on the grid of FIG. 13. Each of the 8 groups would "vote" for a 50% condition, which implies they be on an edge. Examination of the pixels in the center group would yield a conductor on the left half and a space on the right half. By simple logic, given the center group is on an edge with a conductor on its left side, the group to the left of the center, which is also 50%, must be on the right edge of a line; and the group to the left of the center group (also 50%) must be on an edge with the space on its left and with a conductor on its right. The only quantization pattern which satisfies these conditions is a "1 0 1" pattern for the center sample points, which detects the space between two conductors. Implementation of such decision rules can be effected with EP1810 programmable logic devices produced by said Altero Corporation.

A further real time subsampling and pattern comparison technique may also be employed for missing feature checking, as later described in connection with FIGS. 15 and 16.

Having explained techniques utilized in accordance with the invention, it is now in order to examine a complete and detailed system implementation therefor, describing first wafer and similar inspection applications, and then printed circuit board and similar inspection applications.

Wafer and Printed Circuit Board System Implementation

Referring now to the total system block diagrams of FIGS. 15 and 16, useful for wafer and similar inspection purposes, and portions of which appropriately modified are useful for inexpensive printed circuit board inspection and similar applications as well, a CCD or other visual input camera is shown at A for optically acquiring the image data. In the generic machine, applicable for multiple type inspection uses as before discussed, data is relatively physically large, the object is inspected by looking at contiguous strips, as previously explained in connection with FIG. 1. The memory, in one mode, may be only sufficient to store one scanned strip and then permit its analysis; or the memory may be made large enough to store the entire board and then process. Since no great speed advantage would be obtained by the latter, the memory B is shown at least large enough for one strip in FIG. 15. Another mode, later discussed in connection with the embodiment of FIG. 16, may involve enough processing logic to process the data without even storing it, but FIG. 15 illustrates the preferred storage.

The imaged strip information stored in memory B is now read out at "Data out" for two independent functions. One function is to test for conductor line widths and line spacing—earlier described "Step 3", FIGS. 4A-D. This is done by intelligent language modules shown as sequentially successive line width shrink or expand stages $C_1, C_2, C_3 \ldots C_N$ and line spacing stages $D_1, D_2 \ldots D_N$, earlier represented as Z stages in FIGS. 5, 6 and 8-10, programmed to look either for spacing or to look for line width. The programming sets a given range or ranges of permissible line widths that are acceptable, with other line width ranges not acceptable. For example, a line of 10 to 15 pixels could be acceptable; but 15 to 25 pixels would not be acceptable; 30 to 34 may be acceptable, but not outside such range. The data is thus read out of the memory B and it sequentially passes through each successive sequential line width unit $C_1, C_2, C_3$, etc., either electronically to shrink a line image by one pixel on each side, or expand the line by one pixel on each side. In the case of measuring a line width, the successive series of operations each shrinks the line by one pixel as discussed earlier in connection with FIGS. 4 and 5. Since the stages have been programmed with the minimum acceptable or permissible line width, such as, for example, 10 pixels, then if the 10th C-unit provides a line reduced to one pixel, this is allowable if it occurs at this number 10 C-stage. If, however, the 5th C-stage should produce a line reduced or shrunk to a single pixel, this would indicate the line was only 5 pixels wide, which is not allowable, and would flag an error.

As another example, if it is assumed that line widths of 10 pixels are allowable and line widths of 20 pixels are allowable, the system should produce lines reduced to a single pixel at C-unit number 10 after 10 shrinks; and at C-unit number 20, after 20 shrinks. Any other numbered C-unit should not produce any lines reducing to a single pixel. In reality, there may be some tolerance allowed, such as allowing any line between 8 to 12 pixels wide to reduce to a single pixel shrink, programmed accordingly (see earlier Table I). Thus, unless the sequential number of the C-stage unit producing a line width shrunk to one pixel is equal to the predetermined permissible range(s) of pixels of the original imaged conductor line ($C_{10}$ for a 10 pixel line; $C_{20}$ for a 20 pixel line), an error will be indicated, as later explained. If the C-stage has a sequential number less than or greater than the predetermined permissible line width measured in pixels, it is an error.

To measure the spacing between lines, as more fully hereinafter discussed, instead of measuring the width of the line conductors, the width of spacing between the lines is measured by each sequential unit, effectively shrinking the space between adjacent conductor lines, as by sequentially expanding the lines. If the minimum allowable spacing is N pixels, then N stages of shrinks of the spaces reduce to a single pixel of spacing.

In FIG. 15, the line width shrinking is effected in successive stage units $C_1, C_2, C_3 \ldots C_N$ shown as a process parallel to the line spacing shrinking of successive stage units $D_1, D_2 \ldots D_N$ embodying the same hardware as the C-stages. Once a C-stage line width unit has detected that an error exists, that error is passed on to successive line width cards, and is stored back into the memory B as at $C^1$. One thus stores the image of the lines in memory B, accesses it, shrinks all lines one pixel per stage, feeds it back into memory, and can pull out memory a second time for further shrinking if required. As before stated, moreover, one can either put the data into memory and successively perform operations in a sequential manner accessing the memory and each time shrinking or expanding the lines by one pixel as in FIG. 15; or one could just have multiple lines with cards or processing units and pipeline process it as in FIG. 16. In either mode, the novel intelligent architecture of the line width unit of the invention is employed.

In wafer inspection applications where the amount of data is extremely high, it is advantageous to process the data as rapidly as possible—the fastest architecture residing in having a large number of line width cards to be able to process the data in real time on the fly, later discussed in connection with FIG. 16. Wafers, unlike printed circuit boards, moreover, do not generally have holes in them so that in such case the inspection is concerned with strictly looking at conductor or no-conductor presences.

For use in wafer inspection and similar applications, in addition to providing a line width inspection capability, capability for measuring or looking for missing features is also provided. This is done by initially showing the machine a sample of a good image, crudely subsampling the image and storing a relatively crude version of the pattern in memory. Subsampling is done first in a crude subsampler E, FIG. 15, and a smart subsampler F. The final subsampled image is then pattern-compared to a prestored image in G to determine whether any pattern is missing or not. For the missing feature option, a position card I is provided that compensates for any skew of the original pattern. Likewise, in the high speed option, since for the wafer machine the incorporation of a large number of line width cards to process data in real time is preferred, as before explained, pattern matching is also processed in real time. Another card H stores the "don't care" information of earlier "Step 1. Marking 'Don't Care' Regions", indicating to the machine that certain areas are not to be inspected and hence will not be. The final results of any errors, either from the pattern comparison unit or from the line width units, are inputted to a Coordinate Report block J which stores a list of those locations where errors were detected. For wafer and similar inspection applications, moreover, as previously described, the memory B of FIG. 15 may, if desired, be deleted and a larger number of line width cards with C and D sequential stages employed to permit of real time pipeline processing as shown in FIG. 16. A diagnostic frame grabber for error review is also provided at K.

While there has been previous reference to the intelligent line width C and D stages, stating their performance functions, it is now in order to describe how they are constructed, with particular reference to FIG. 17 and earlier described FIG. 10. The scan image data, direct or from memory B, is shown at the left hand input of FIG. 17, labelled "N bits", applied ultimately to a pixel matrix (EPM5128) shown illustratively as nine pixels organized in a 3×3 manner at M1-M9. Each spatial location is encoded to represent bright, dark, questionable, intermediate or gray level, or error, in the case of the inspected wafer surface. (As later explained, for printed circuit inspection applications, the representation may be for substrate laminate regions, metal conductor, hole or error). The intelligent programming for processing decisions in each shrink and expand stage unit C and D of FIGS. 15-17, may be that of Table I earlier presented, with the line width, line spacing, speck, break and protrusion logic analysis (FIGS. 4 and 6—"Step 3") applying to both wafer and printed circuit board applications; and the annular ring hole analysis also to the latter, as explained, hereinafter and previously in connection with FIGS. 2-4—"Step 2" and "Step 3".

Consider, therefore, a case where there is a metal conductor carried on and surrounded by glass or other material substrate regions. For inspection, one may illuminate the substrate from below as well as reflecting light off the top of the substrate. Thus, shiny areas of line metallizations will appear bright, the glass will also appear bright, but duller metal line areas will appear dark. At the actual edge between the glass and a bright conductor, there is usually an image discontinuity which will also appear as a gray level type of line. After a few shrinks by successive C-stages, the image will appear effectively as a bright area, a somewhat middle gray scale area that's very small, and then again a bright area. While a questionable or grayish brightness range may result thus from a proper substrate region and not constitute an actual defect, experience shows that this is also a characteristic of an edge discontinuity. To contrast from an actual defect, if there were produced a bright region with a very sharp or small short, that short would appear as a non-reflective dark region. After a number of shrinks, therefore, there would result a bright region, a single pixel very dark line, and then a bright region again. Now the conducting material is dark rather than of a questionable gray range, and thus would constitute a defect. Thus, bright questionable regions are not defects; while bright, very dark regions are defects.

Other types of defects on a wafer, furthermore, might be a large blob or short which is sort of dull and not very shiny at all. Such shorts, therefore, would again image as a bright area, a large sort of dull dark area, and a bright area. Now, rather than this reducing to a single line after 2 or 3 shrinks because of the size of the short, even though very dull, it might take, say, 20 shrinks. If, accordingly, there is produced a region which is bright, questionable range, bright again, but it takes 20 shrinks to get there, this would definitely be definable as a defect. In accordance with the technique of the invention, therefore, analysis is made both of the material surrounding the line and the line and the line and space sizes to distinguish and differentiate between a valid defect and one which is not. The shrunk conductive line image is examined in the context of its surrounding substrate material regions to verify whether this is a permissible line-surrounding region combination or a defect or error. This is in addition to verifying whether the sequential number of the C or D stage that produces the one pixel line or space corresponds to the predetermined allowable line width range of pixels, as before explained.

Returning, therefore, to the M1-M9 matrix of FIG. 17 with spatial locations encoded, as before stated, to represent bright, dark, questionable gray level and/or error conditions, the programmed decision logic at L distinguishes the same, with successive one-line CCD scan image delays introduced into the successive pixel matrix lines M1-M3, M4-M6 and M7-M9, as shown. In generic terms, for N=2, the following relationship may apply:

| Bit 1 | Bit 2 | Analysis |
|---|---|---|
| 0 | 0 | Material 1 |
| 1 | 0 | Material 2 |
| 0 | 1 | Material 3 |
| 1 | 1 | Error |

Depending upon whether the line width shrink functions or line spacing shrink functions (line expansion) are desired, the line width processing stage C or D may be controlled by the "Selector Shrink/Expand" multiplex control MUX.

In the specific terms of the wafer structure with, for example, an aluminum metal line depression on a glass substrate, so-labelled in FIG. 18, overlayed with a glass covering carrying, in turn, a gold metal application at an adjacent region, illumination during the imaging scan will produce the following image lightness variations:

|  | Top View (Top & Bottom Lighting) | Bottom View (Top Lighting Only) |
|---|---|---|
| Aluminum | Bright | Bright |
| Gold | Dark | Semi-bright |
| Glass | Bright | Dark |

This is graphically represented by the signal waveform of FIG. 19.

This same philosophical approach applies, as previously described, for printed circuit boards and similar devices that, in addition, have via and other holes, as well. To process this, the memory B is needed and with a somewhat different type of processing architecture, earlier described in "Step 2. Processing Holes", FIGS. 1-3. In such application, a strip of the board is scanned and fed into the memory, stored as two bits, D0, D1 of FIGS. 1A and 1B, that are absolutely identical. One of the bits is processed to locate the center of all holes. This is done as follows. The memory B is accessed and passes through a line width unit C that would effectively shrink the entire pattern, continuing to shrink until either reduced to a single dot or a single width line, FIG. 2. Any circle will reduce to a single dot as it is shrink down and as the circle collapses, effectively finding the center of all circles as a single dot, as earlier described in connection with FIGS. 1A-2C. The memory now has effectively stored two images—one being the original image showing the actual circuit board, and the second bit showing the single dots or centers of all the holes. This second bit, indicating the presence or location of all holes, is now expanded, FIG. 3. This is done by reading the memory B through the shrink expand stage units and expanding only the bit indicating the location of the hole. The bit is continually expanded until the hole is filled in, FIG. 3C, this happening when the center makes contact with the annular ring. This provides, when combined with the other bit D1 (FIG. 1B), as in FIG. 3D, the equivalent of a circuit board image with no holes present. Now the process inspects all the line widths with the original stored image (which has not been affected at all except for having its holes filled in) by sequentially passing that image through the line width card C-stages, each time shrinking and measuring how many shrinks are required to shrink the line to a single point pixel, so as to determine whether any line width violations (errors) have occurred. If an error is detected and then the information is stored back into the memory at the location of the specific error, a code for the error is deposited. Likewise, when this entire operation is finished and the width of all lines measured, the memory then has left in it all located errors marked accordingly. The memory is again accessed, inspecting for all line spacings through line width card stages, as before discussed. If any space width reduction (or line expansion) to a one pixel state is produced other than at the appropriate numbered stage, there is a spacing violation.

When the entire process is finished, the memory has in it effectively an image with all error locations marked accordingly. At this point, the computer now has access to the memory and can scan through the memory. It will find errors located either where there are true errors existing or perhaps other areas such as "don't care" areas, or areas where it could be nomenclature or patterns that violate the original circuit design but are of no interest. Since these "don't care" coordinates can be stored in the computer when it accesses the memory, it will know which areas to look at and which areas not to look at. This technique results in a relatively inexpensive machine that just needs a line width card, the above memory architecture, CCD, computer and perhaps a postion coordinate card to tell the memory some position information about the board as it is being scanned.

Returning to FIGS. 15 and 17 and considering the printed circuit board application, the circuit board may have annular metal rings defining holes and which can be smaller in line width than an acceptable conductor line. This means, however, that if lines were to be reduced to the same width as an annular ring width this would be an error. So as not to confuse the machine, it is therefore necessary carefully to distinguish the difference between such metal rings or metal conducting areas which constitute an annular ring as compared to other metal areas which constitute line width connections or tracers or conductors that feed into such annular rings. To do this, as has been described previously, the scanned image is stored effectively as two bits. The line width unit C continually shrinks the bits until donuts reduce to single points, automatically locating the location of all holes. At this point the center point is expanded and superimposed on the actual image until the expansion of the hole entirely fills the circle of the annular ring, hence transforming what would have been a donut into a solid circle. Now, henceforth, the next stage of processing can reliably look for all conductors less than the predetermined given pixel range width. If actual signal tracers of small width are found, this would be an error which will not now be confused with an annular ring.

Having accomplished the "removal" of all annular rings, the line width units can now be reprogrammed to then reprocess the image stored in memory B and look for line widths of different tolerances; for example, lines of 10 pixels, 20 pixels, 30 pixels, or whatever is desired. So the flexibility of easily reprogramming these line width cards is very useful.

As another example, there may be boards with annular rings that are very wide—as wide as a line. In this case, one can actually skip the entire first process, above, and inspect the board directly, with line width units appropriately programmed.

It should be noted, moreover, that current machines that measure a line width have fixed patterns that actually try to measure cross-sectional measurements of the line. When lines have very weird shapes, bends, curves, quite often the algorithm must be disabled or fails or cannot measure the width at these points. However, the algorithm of the present invention, because it is entirely shape and rotation independent, enables one to measure the widths of a line at any orientation, shape, curl, zig-zag or other shape, whatever, providing a much more general and powerful algorithm.

As an example, a given board may have randomly shaped curves, lines, bends of all sorts and at different orientations. The machine will be programmed for permissible line ranges, for example, of 10 pixels and 20 pixels, plus or minus 2 pixels; say, lines anywhere from 8 to 12 pixels are permissible or allowable and 18 to 22 pixels are allowable, but anything out of these ranges would be errors. The image of the line is passed through the consecutive sequential shrink operations C. Each time, one pixel is subtracted from the edge of the line. Eventually, after a certain number of shrinks, the line will reduce to a single pixel width. At this point the line is no longer reduced. If the sequential number of the stage is 8 through 12, this indicates that the line was the permissible 8 to pixels; or if the single pixel is reached in stages 18 to 22, this indicates that the section was between permissible 18 and 22 pixels. If, however, any other stage indicated a line width reduced to a single pixel, this would indicate an error at the final output of the machine; or, in a case of an intermediate memory, that location of memory is marked as being the location of an error. If there are just line width units sequentially processing the data, that coordinate is indicated and listed as containing the error.

Where line spacing width is inspected, the successive D stages in this parallel processing (FIGS. 15 and 17) actually successively expand the line (shrinking the spaces therebetween), bounding the space one pixel at a time, until one of those stages indicates a space width of one pixel. In the event that the sequential number of that stage is within the numbers of permissible pixels, which corresponds to the allowable spacing range, this is within the design. But if that said one stage where the space width has been reduced to one pixel is of a stage number less than or greater than the pixel number of the permissible range(s) that have been predetermined, then this is an error and will be so indicated.

This takes care of permissible line width and line spacing inspection. As earlier stated, however, once the conductor line image has been reduced to the single pixel, the system must still determine where this is relative to the substrate laminate or the hole regions, and/or whether this may otherwise be an error—i.e., the permissible context or combination of line and surrounding substrate regions, as in FIG. 4. For example, it is assumed that 10 pixel lines are correct in a circuit board and anything less for line width is an error. Let it also be assumed that annular rings or holes can be as small as a conductor ring of 4 pixels and still be correct. Thus, a 4 pixel ring of metal around a hole is correct; but 4 pixels for a large conductor is an error. Proceeding with the algorithm of the invention, one would shrink the annular ring. After 4 shrinks, one would obtain the region that would be a single pixel wide ring with laminate on the outside of the ring and hole on the inside of the ring.

Such a combination, even though it reduced to a single line after 4 shrinks, with laminate on one side and hole on the other, would indicate this is an annular ring and hence not an error.

As another example, an actual conductor line which is reduced after 4 shrinks to a single pixel reduction, would look at the region on both sides and see laminate. This would mean that it was indeed a conductor and would be marked as an error. This is analogous to the way differentiation and correctness of combinations of regions and conductors in context were ascertained for wafers, as before explained.

Considering, again, the shrink stage details of FIG. 17, information on the number of regions or materials involved must be encoded. The four possibilities effectively in the case of a circuit board have been earlier identified as the laminate, the conductor, a hole, or an error. As the conductor is shrunk effectively, each pixel maintains a label. The label for that pixel is one of the possible labels: laminate, conductor or hole, initially. If, after a certain number of shrinks, a valid error is found, (for example a thin conductor between two areas of laminate), such would be labelled an error and the point would be marked as such, so that when all the surrounding points are analyzed to make the decision, they are analyzed in the context of what that point really is.

As a further illustration, if there were a very small conductor of, say, 3 pixels, and it was surrounded with a hole on one side and laminate on the other, this would be allowable because it would constitute an annular ring. If, however, there was a very small thin line of perhaps 4 pixels, again, but it was surrounded by laminate on both sides, then it would be classified as a defect and would not be permissible.

For a very inexpensive printed circuit board machine, one could reduce the shrink C- and D-stages to C1 and D1 and, if desired, omit the refinements of the subsampling, coordinate reporting, etc. (E-J) of FIG. 15.

While, moreover, the successive shrink or expand stages electronically remove one pixel at a time, if desired, a predetermined constant number of such pixels could be removed in some applications; the one pixel at a time mode being particularly important for the before-described wafer, printed circuit board and similar applications.

Further modifications will occur to those skilled in this art and such are considered to fall within the spirit and scope of the invention as defined in the appended claims.

What is claimed is:

1. A method of detecting deviation of a scan-imaged conductor line width from a predetermined range(s) of allowable numbers of pixels, wherein the conductor line is of a particular metal material carried on a substrate of other material surrounding the line, as on a wafer or printed circuit board, the method comprising scan-imaging the conductor line and the surrounding substrate regions; establishing and programming each of a predetermined permissible range(s) of allowable number of pixels of line width and a permissible line-surrounding region combination; successively electronically shrinking the imaged conductor line, one pixel at a time, in a number of successive sequential shrinking stage operations until the imaged line in one such stage is only one pixel; examining in accordance with said programming the thusly shrunk image in the context of its said surrounding substrate regions to verify the said permissible line-surrounding region combination; and indicating an error in the event that either the line-surrounding region is not verified as said permissible combination, or the sequential number of the said one stage is less or greater than the stage number(s) corresponding to said permissible range(s) of pixels.

2. A method as claimed in claim 1 and in which wafer inspection is effected and wherein during said shrinking, differentiation of bright, dull and intermediate images is effected to verify the said permissible line-surrounding region combination and distinguish a valid defect.

3. A method as claimed in claim 2 and in which "don't care" imaged regions are ignored.

4. A method as claimed in claim 2 and in which the imaged line data is parallely processed in said sequential stage operations, successively shrinking the imaged line width and the imaged space between lines, one pixel at a time.

5. A method as claimed in claim 4 and in which the imaged line data is stored in memory prior to said successive shrinking operations.

6. A method as claimed in claim 1 and in which the errors are marked and stored.

7. A method as claimed in claim 1 wherein the imaged line data is also subsampled and compared with a known pattern for missing feature detection.

8. A method as claimed in claim 1 wherein in each shrinking stage, line width shrinking is selectively controlled.

9. A method as claimed in claim 1 wherein in each shrinking stage, line data is fed by successive line delays to a pixel matrix, the spatial location therein being encoded to represent bright, dark, questionable gray level and a line width or space error.

10. A method as claimed in claim 1 and in which printed circuit board inspection is effected and wherein during said shrinking, differentiation of substrate non-conductor region material, metal conductor, hole and error images is effected.

11. A method as claimed in claim 10 and in which "don't care" regions are ignored.

12. A method as claimed in claim 10 and in which the imaged line data is stored in memory and is parallely processed in said sequential shrinking stage operations, successively shrinking the imaged line width and the imaged space between lines, one pixel at a time.

13. A method as claimed in claim 10 and in which the imaged line data is processed as two identical image data bits representing an imaged hole, one data bit being shrunk to shrink the hole to a single pixel representing the hole center and erasing all other information, and then expanding said one image data bit effectively to fill the hole, the filled hole being combined with the other image data bit, and sequencing the shrinking of the combined image data.

14. A method of detecting the deviation of an imaged space between conductors of any shape or orientation on a printed circuit board or wafer or the like from a predetermined range(s) of allowable numbers of pixels, that comprises, establishing and programming the permissible range(s) of allowable number of pixels of space width between conductors; successively electronically enlarging the imaged conductors one pixel at a time in a number of successive sequentially expanding stage operations until the imaged space between the conductors in one such stage is only one pixel; and indicating in accordance with said programming a space width range(s) less than or greater than the stage number(s) corresponding to said permissible range(s) of pixels.

15. A method as claimed in claim 10 and in which the shrinking stage is programmed to determine whether a shrunk single pixel-wide line is or is not a permissible pattern depending upon whether it is between a region of hole and substrate non-conductor material or between two regions of the latter.

16. A method as claimed in claim 15 wherein permissible annular conductor ring lines defining holes may be M pixels wide, while other conductor lines may be N or W pixels wide, where $M<N<W<Z$, such that after M shrinks of the successive sequential shrinking stage operations, a single pixel wide line is permissible if surrounded by a hole region on one side and substrate material on the other side, thereby identifying the line as part of an annular ring; but the single pixel wide line is not permissible if surrounded by substrate material on both sides, being a non-permissible line width error; and in which Z is the said sequential number of the said one stage.

17. A method as claimed in claim 8 and in which said successive shrinking is effected in real time in response to the imaged conductor.

18. A method as claimed in claim 5 and in which after said shrinking operations the imaged line data is fed back into memory and is accessed again from memory for further required shrinking operations.

19. Apparatus for detecting deviation of a scan-imaged conductor line width from a predetermined range(s) of allowable numbers of pixels, wherein the conductor line is of a particular metal material carried on a substrate of other material surrounding the line, as on a wafer or printed circuit board, said apparatus having, in combination, means for scanning and imaging the conductor line in digital data format; means for establishing and programming each of a predetermined permissible range(s) of allowable number of pixels of line width and a permissible line-surrounding region combination; means for successively electronically shrinking the imaged conductor line, one pixel at a time, in a number of successive sequential shrinking stages of operation until the imaged line in one such stage is only one pixel; means for examining the thusly shrunk image in accordance with said programming in the context of its said surrounding substrate regions to verify the said permissible line-surrounding region combination; and means for indicating an error in the event that either the line-surrounding region is not verified as said permissible combination, or the sequential number of the said one stage is less or greater than the stage number(s) corresponding to said permissible range(s) of pixels.

20. Apparatus as claimed in claim 19 and in which wafer inspection is effected and wherein means is provided for differentiating, during operation of said shrinking stages, bright, dull and intermediate images to verify the said permissible line-surrounding region combination and distinguish a valid defect.

21. Apparatus as claimed in claim 20 and in which means is provided for storing "don't care" imaged regions and ignoring the same.

22. Apparatus as claimed in claim 20 and in which means is provided for parallely processing said sequential stage operations successively to shrink the imaged line width and the imaged space between lines, one pixel at a time.

23. Apparatus as claimed in claim 22 and in which the processing means operates in real time.

24. Apparatus as claimed in claim 22 and in which memory means is provided for storing the imaged line data prior to accessing the same for said successive stage shrinking operations.

25. Apparatus as claimed in claim 19 and in which means is provided for marking and storing the indicated errors.

26. Apparatus as claimed in claim 19 and in which means is further provided for subsampling the imaged line data, and means for comparing the subsampling with a known pattern for missing feature detection.

27. Apparatus as claimed in claim 19 and in which each shrinking stage comprises means for selectively controlling line width shrinking.

28. Apparatus as claimed in claim 19 and in which each shrinking stage comprises successive line delay means for feeding a pixel matrix, with means for encoding the spatial location therein representing bright, dark, questionable gray level and line width or space errors.

29. Apparatus as claimed in claim 28 and in which the wafer comprises a first metal conductor line on a glass substrate overlayed with a glass covering in turn containing a further metal at an adjacent region, and said imaging means scans the wafer with both top and bottom lighting producing, in a top view, bright first metal and glass images and a dark further metal image; and a bright first metal, dark glass and semi-bright further metal images under top lighting only.

30. Apparatus as claimed in claim 19 and in which printed circuit non-conductor substrate board inspection is effected and in which means is provided, during the operation of the shrinking stages, for differentiating substrate non-conductor region material, metal conductor, hole and error images.

31. Apparatus as claimed in claim 30 and in which means is provided for storing "don't care" imaged regions and ignoring the same.

32. Apparatus as claimed in claim 30 and in which means is provided for parallely processing said sequential stage operations successively to shrink the imaged line width and the imaged space between lines, one pixel at a time.

33. Apparatus as claimed in claim 30 and in which memory means is provided for storing the imaged line data prior to accessing the same for said successive stage shrinking operations.

34. Apparatus as claimed in claim 33 and in which means is provided for feeding back the imaged line data into said memory means after said shrinking operations and for accessing the same again from memory for further required shrinking operations.

35. Apparatus as claimed in claim 30 and in which means is provided for processing the imaged line data as two identical image data bits representing an imaged hole, means for shrinking one data bit to a single pixel representing the hole center and erasing all other information and then expanding said one image data bit effectively to fill the hole, and means for combining the filled hole with the other image data bit and sequencing the successive shrinking stages on the combined image data.

36. Apparatus as claimed in claim 30 and in which means is provided for programming the shrinking stages to determined whether a shrunk single pixel-wide line is or is not a permissible pattern depending upon whether it is between a region of hole and substrate non-conductor material or between two regions of the latter.

37. Apparatus as claimed in claim 26 and in which the programming means provides for permissible annular conductive ring lines defining holes M pixels wide, while other conductor lines may be N or W pixels wide, where M<N<W<Z, such that after M shrinks of the successive sequential shrinking stage operation, a single pixel wide line is permissible if surrounded by a hole region on one side and substrate material on the other side, thereby identifying the line as part of an annular ring: but the single pixel wide line being not permissible if surrounded by substrate material on both sides, such constituting a non-permissible line width error; and in which Z is the said sequential number of the said one stage.

38. A method as claimed in claim 1 and in which said one pixel is changed to predetermined number of pixels.

* * * * *